Patented Oct. 12, 1954

2,691,655

UNITED STATES PATENT OFFICE 2,691,655

2-AMINO-4-SUBSTITUTED AMINO-6-ARYL PYRIMIDINES AND PROCESS OF PREPARING SAME

George H. Hitchings, Tuckahoe, and Peter Byrom Russell, Crestwood, N. Y., assignors to Burroughs Wellcome & Co. (U. S. A.) Inc., Tuckahoe, N. Y., a corporation of New York No Drawing. Application May 24, 1952, Serial No. 289,907

2 Claims. (Cl. 260—256.4)

The present invention relates to a new group of aminopyrimidines which possess outstanding physiological properties in veterinary medicine and are believed to have application in the treatment of certain human ailments. The derivatives have been discovered to be active agents for inhibiting the growth and multiplication of certain virus of the type susceptible to rapid multiplication and growth. This is a continuation in part of application Serial No. 101,256, filed on June 24, 1949, now abandoned.

Compounds of this invention are represented by the formula

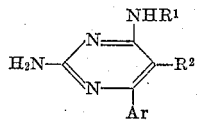

wherein Ar is selected from the class consisting of phenyl and naphthyl, $R^1$ is selected from the class consisting of alkyl, benzyl and phenyl, and $R^2$ is selected from the class consisting of alkyl, benzyl and hydrogen.

The compounds of the present invention may be conveniently synthesized by the initial preparation of the corresponding 4-hydroxy derivative by refluxing an alcoholic solution of guanidine carbonate with a selected keto ester until the reaction is complete. This reaction may be represented as follows:

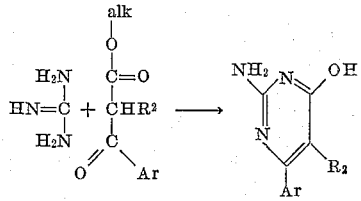

wherein Ar and $R^2$ are defined as mentioned above. The 4-hydroxy derivative is recovered by aqueous dilution and acidification of the reaction mixture in the usual manner.

The hydroxy aminopyrimidine may then be converted to the corresponding chloro derivative by treatment with excess phosphoryl chloride under reflux conditions. The 4-chloroaminopyrimidine is then reacted with an amine of the formula $R^1HN_2$ where $R^1$ is defined as above. For this purpose water, alcohol or mixtures thereof are suitable solvents. The base is usually employed in considerable excess as will be seen from the examples and it is convenient to use a saturated solution either in water or in alcohol.

By a somewhat modified but equally convenient procedure the above mentioned 4-hydroxy aminopyrimidine derivative can be converted into the corresponding 4-sulfhydryl pyrimidine by the method of Hitchings and Elion as disclosed in U. S. Patent No. 2,415,793. This derivative is then transformed into the selected aminopyrimidine by the method of our copending applications Serial No. 261,394, filed on December 12, 1951, and Serial 261,395, filed on December 12, 1951, by drastic treatment with an amine as follows:

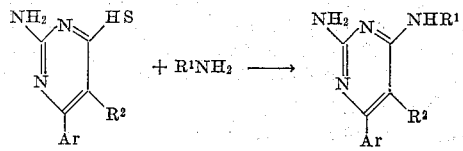

The reaction proceeds smoothly with the replacement of the sulfhydryl group by the $R^1$ amino group by reflux or in a sealed container.

By a further method the compounds may be prepared by the initial formation of a 2-sulfhydryl-4-hydroxy pyrimidine by the reaction of a keto ester with thiourea

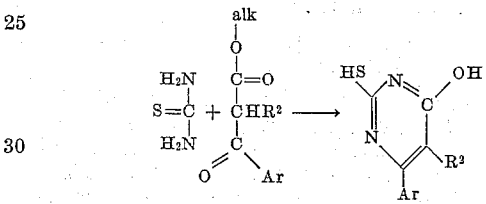

followed by conversion of the hydroxy group into a second sulfhydryl group and the desired aminopyrimidine prepared by the methods of our copending application.

The following procedures illustrate specific methods for preparing the new derivatives in accordance with the present invention.

EXAMPLE 1

(a) *2-amino-4-hydroxy - 5 - propyl - 6 - phenylpyrimidine*

Ethyl α-propylbenzoylacetate (47 g.) was refluxed with guanidine carbonate (12 g.) in ethanol (200 cc.). After six hours the solution was poured into water (500 cc.). The solid was filtered and washed with ether. On recrystallization from ethanol the product formed flat needles, M. P. 311–313° (dec.).

(b) *2-amino-4-chloro-5-propyl-6-phenylpyrimidine*

The above aminohydroxypyrimidine (10 g.) was refluxed with phosphoryl chloride (50 ml.)

until all dissolved. The excess phosphoryl chloride was removed and the residue poured onto ice. The mixture was made alkaline with ammonia and after one hour the product was filtered off.

(c) *2-amino-4-methylamino-5-propyl-6-phenylpyrimidine*

One half of the product from the previous reaction (ca. 5 g.) was heated at 150° for 16 hours with a saturated alcoholic solution of methylamine (100 ml.). At the end of this time the solution was evaporated to dryness, washed with aqueous alkali and the product (4.2 g.) recrystallized from aqueous ethanol. It melted at 198°.

EXAMPLE 2

*2-amino-4-anilino-5-propyl-6-phenylpyrimidine*

The remainder of the chloro compound (1–b) (ca. 5 g.) was refluxed with aniline (25 ml.) for 5 hours. On cooling the mass solidified. It was washed free from aniline with ether and recrystallized from aqueous ethanol. It formed needles, M. P. 171°.

EXAMPLE 3

(a) *2-amino-4-hydroxy-5-benzyl-6-phenyl-pyrimidine*

Ethyl α-benzylbenzoylacetate (58 g.) was refluxed with guanidine carbonate (30 g.) in ethanol (100 ml.). The mixture was poured into water, acidified with acetic acid and filtered. After recrystallization from ethanol it melted at 340° (dec.).

(b) *2-amino-4-chloro-5-benzyl-6-phenyl-pyrimidine*

The above aminohydroxypyrimidine (10 g.) was heated with phosphoryl chloride (75 ml.) until it was completely dissolved. The excess phosphoryl chloride was removed in vacuo and the residue poured onto ice and basified with ammonia. The amino chloro compound (ca. 8 g.) was collected on a filter.

(c) *2-amino-4-methylamino-5-benzyl-6-phenylpyrimidine*

One half of the above product was treated with a saturated solution of methylamine in alcohol (100 ml.), in a bomb at 150° for 12 hours. At the end of this time the excess methylamine was evaporated and the product worked up by washing with alkali and crystallizing from ethanol. It melted at 177°.

EXAMPLE 4

*2-amino-4-anilino-5-benzyl-6-phenylpyrimidine*

The remainder of the chloro compound (3–b) was refluxed with aniline (20 cc.) for 3 hours. After cooling the aniline was removed with ether, the residue washed with N sodium hydroxide and recrystallized from ethanol. It melted at 211°.

EXAMPLE 5

*2-amino-4-methylamino-6-beta-naphthyl pyrimidine*

This compound was prepared by the procedure set forth above with respect to Examples 1 and 3, using a 25% aqueous solution of methylamine. It crystallized from aqueous methanol in colorless needles having a M. P. of 238–239°.

A similar procedure was followed for the preparation of 2-amino-4-methylamino-5-benzyl-6-alpha-naphthylpyrimidine; 2-amino-4-methyl-amino-5-hexyl-6-beta-naphthylpyrimidine and 2 - amino - 4 - methylamino - 5 - propyl-6-alpha-naphthylpyrimidine.

EXAMPLE 6

*2-amino-4-methylamino-6-phenylpyrimidine*

This compound was prepared from 2-amino-4-chloro-6-phenylpyrimidine exactly as above. On recrystallization from water it melted at 195–196° and formed small needles.

By the same procedure 2-amino-4-n-butyl-amino-6-p-chlorophenylpyrimidine and 2-amino-4 - n - heptylamino - 6 - o-nitrophenylpyrimidine were prepared.

EXAMPLE 7

*2-amino-4-anilino-6-phenylpyrimidine*

2-amino-4-chloro-6-phenylpyrimidine (8 g.) was refluxed with aniline (4 g.) in glacial acetic acid for 1 hour. On cooling the acetate separated in almost quantitative yield and on recrystallization from acetic acid gave a crystalline material having a M. P. of 305–306° (decomposed).

The same procedure was followed for the preparation of 2-amino-4-benzylamino-6-p-chlorophenylpyrimidine and 2-amino-4-benzylamino-6-p-bromophenylpyrimidine.

EXAMPLE 8

*2-amino-4-p-chloroanilino-6-phenylpyrimidine*

Was prepared as in the previous example. After recrystallization from acetic acid it melted at 304–305°.

The same procedure was followed for the preparation of 2-amino-4-m-chloroanilino-6-beta-naphthylpyrimidine.

EXAMPLE 9

*2-amino-4-p-methoxyanilino-6-phenyl-pyrimidine*

Was prepared as above, it crystallized from acetic acid as yellow prisms melting at 259–263°.

The same procedure was followed for the preparation of 2-amino-4-o-methoxyanilino-6-p-nitrophenylpyrimidine.

The following derivatives showing additional examples of pharmacologically active compounds according to the invention were prepared by the methods previously described above:

10. 2 - amino-4-isobutylamino-5-ethyl-6-o-chlorophenylpyrimidine
11. 2 - amino - 4-isopropylamino-5-n-butyl-6-m-chlorophenylpyrimidine
12. 2 - amino - 4 - isoamylamino - 5 - benzyl-6-p-bromophenylpyrimidine
13. 2 - amino - 4 - secbutylamino - 5-n-heptyl-6-phenylpyrimidine
14. 2 - amino - 4-benzylamino-5-ethyl-6-p-nitrophenylpyrimidine
15. 2 - amino - 4-p-chloroanilino-5-n-butyl-6-p-bromophenylpyrimidine
16. 2 - amino - 4 - bromoanilino - 5 - methyl - 6 - phenylpyrimidine
17. 2 - amino-4-p-methoxyanilino-5-benzyl-6-o-chlorophenylpyrimidine
18. 2 - amino - 4-benzylamino-5-ethyl-6-alpha-naphthylpyrimidine
19. 2 - amino - 4 - p-ethoxyanilino-5-n-heptyl-6-benzylpyrimidine
20. 2 - amino - 4 - o-toluidino-6-p-chlorophenyl-pyrimidine
21. 2 - amino - 4 - p - toluidino - 5 - n-butyl-6-p-nitrophenylpyrimidine 22. 2 - amino-4-p-chloroanilino-5-p-bromotolyl-6-phenylpyrimidine
23. 2 - amino - 4 - n - butylamino - 5 - benzyl- 6 - alpha-naphthylpyrimidine
24. 2 - amino - 4-benzylamino-5-benzyl-6-alpha-naphthylpyrimidine

We claim:
1. 2 - amino - 4 - methylamino - 5 - propyl - 6 - phenylpyrimidine.
2. The method of preparing pyrimidine compounds of the formula

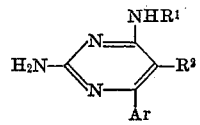

wherein Ar is selected from the class consisting of phenyl and naphthyl, $R^1$ is selected from the class consisting of alkyl, benzyl and phenyl, and $R^2$ is selected from the class consisting of alkyl, benzyl and hydrogen, which comprises reacting guanidine with a β-keto ester of the formula $ArCOCHR^2COOAlk$ to give the 4-hydroxy derivative, treating the latter with phosphorus oxychloride and aminating the resulting compound with an amine of the formula $NH_2R^1$ to give the product.

References Cited in the file of this patent
UNITED STATES PATENTS

| Number | Name | Date |
|---|---|---|
| 2,211,710 | Zerweck et al. | Aug. 13, 1940 |

OTHER REFERENCES

Falco et al.: Br. Journal of Pharmacology and Chemotherapy, 6, 188 and 190 (1951).